W. O. SNELLING.
PHOTOCHEMICAL APPARATUS.
APPLICATION FILED JULY 1, 1914. RENEWED JAN. 3, 1918.
1,271,790.
Patented July 9, 1918.
2 SHEETS—SHEET 2.
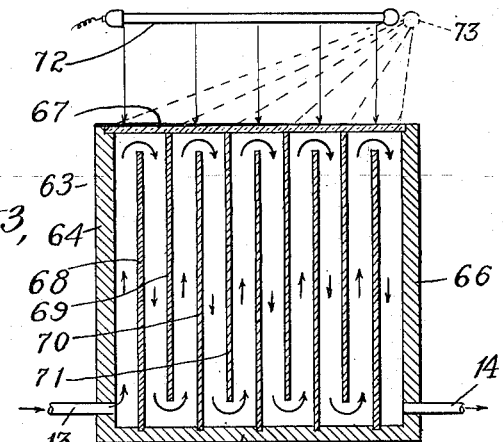
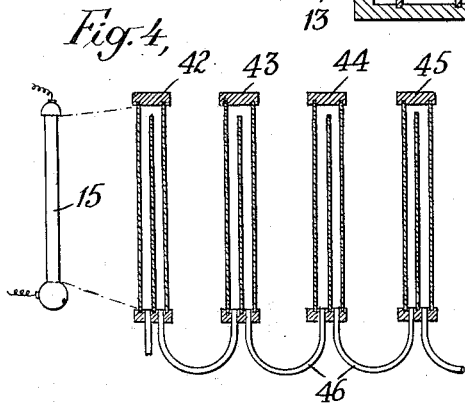
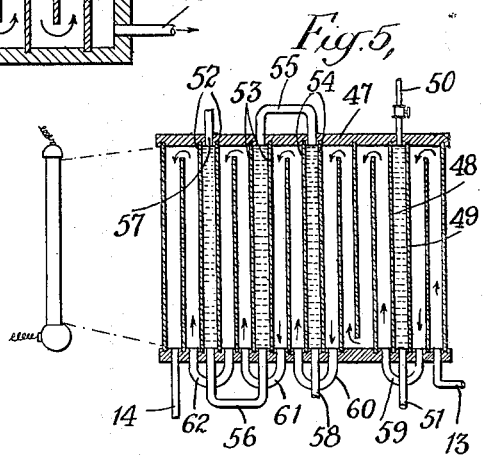
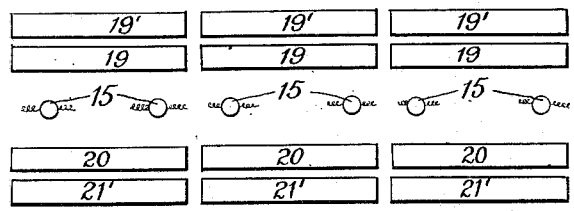
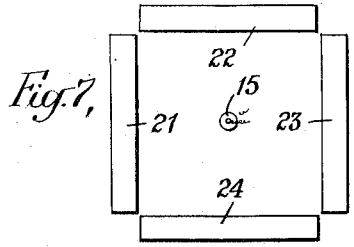
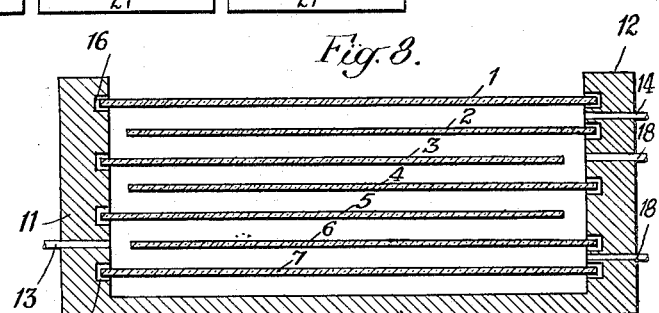
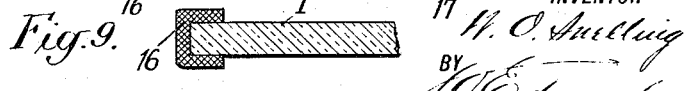

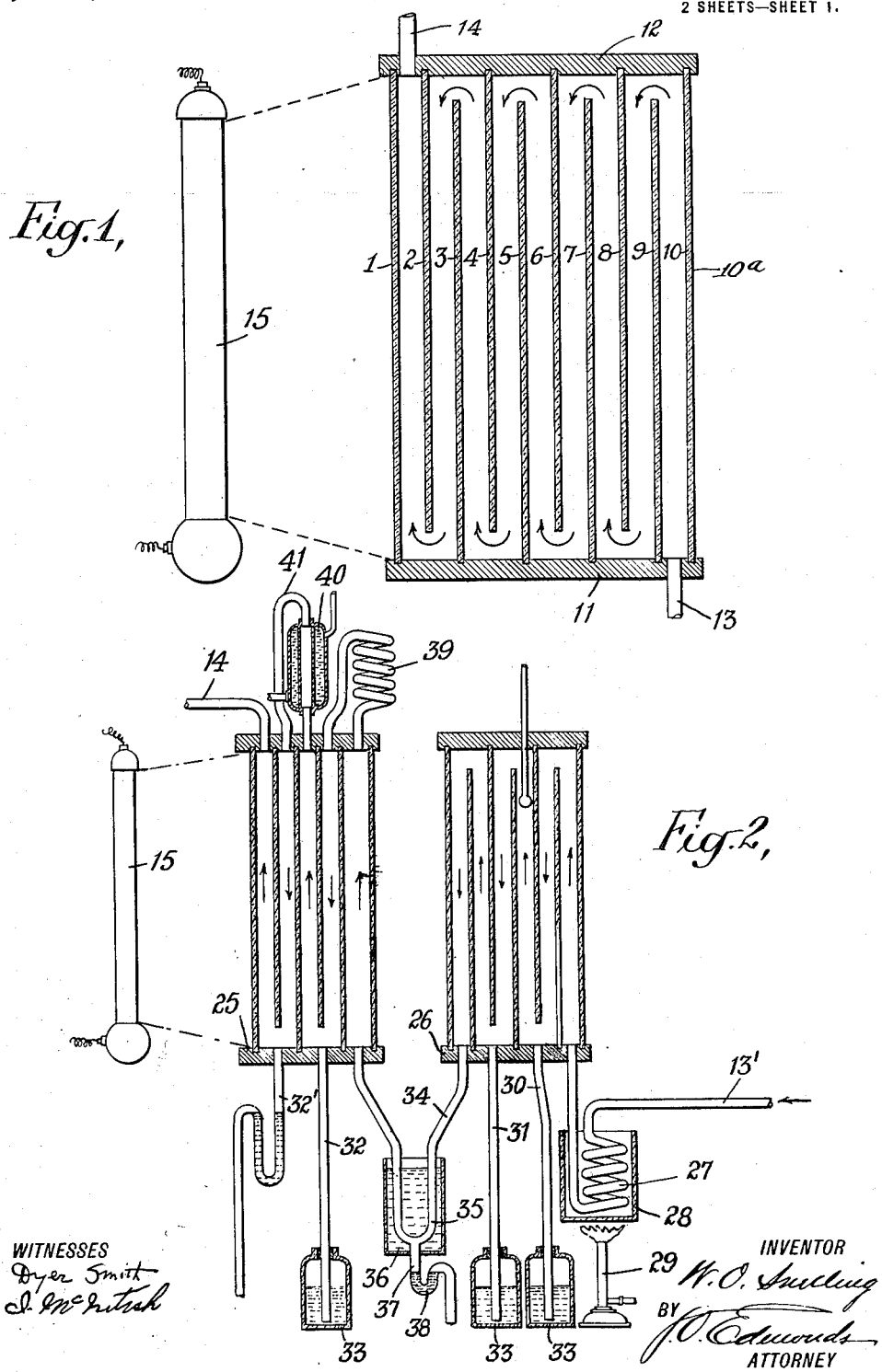

UNITED STATES PATENT OFFICE.

WALTER O. SNELLING, OF PITTSBURGH, PENNSYLVANIA.

PHOTOCHEMICAL APPARATUS.

1,271,790.   Specification of Letters Patent.   Patented July 9, 1918.

Continuation in part of application Serial No. 776,834, filed July 1, 1913. This application filed July 1, 1914, Serial No. 848,355. Renewed January 3, 1918. Serial No. 210,231.

*To all whom it may concern:*

Be it known that I, WALTER O. SNELLING, a citizen of the United States, and a resident of Pittsburgh, county of Allegheny, State of Pennsylvania, have invented certain new and useful Improvements in Photochemical Apparatus, of which the following is a specification.

My invention relates to improved apparatus in which chemical compositions may be prepared by reactions which are accelerated by light. In my application Serial No. 776,834, filed July 1, 1913, entitled Preparation of compounds by the aid of light, I have disclosed improved methods for producing reactions which are facilitated or induced by the action of light and which result in the formation of highly desirable products. My present application is a continuation in part of said application, Serial No. 776,834, covering the apparatus described in said application, together with some additional matter.

The process described in my said prior application may be briefly described as consisting in bringing together substances, reaction between which is induced or accelerated by the action of light, subjecting the same to the action of a restricted amount of light and progressively increasing, by comparatively small increments, the actinic effectiveness thereof in promoting reaction during the progress of the same until the desired compound is formed. Or, stated in another way, the actinic light and the current of the reactive mixture of gases, or of gases and vapors, pass against each other in countercurrent. As the light passes forward through the gases, the amount of actinic rays (or "light concentration") steadily diminishes, while on the other hand as the current of the reactive mixture passes forward against the rays, the concentration of the reactive components (or "reagents") also diminishes. It would seem that there is a point in the apparatus where the amount of reaction is a maximum, where the curve of light concentration and the curve of reagent concentration, if such curves were made, would intersect, establishing a plane of vigorous but calm and regular reaction. With every chemical substance, the rays causing it to be reactive are the rays which it absorbs; and, therefore, the actinic rays which reach the gas mixture at the point where it is of maximum concentration are reduced to a minimum while the actinic activity of the light steadily increases from this point toward the point where the light enters the system. On the other hand the concentration of the active components diminishes toward this point. Operating in this manner, the system finds and establishes its own point of vigorous reaction automatically while the fact that the gas mixture must ultimately pass through a region of energetic light rays insures completion of reaction.

It has long been known that in many reactions, such as those of chlorin or other halogen with various hydrocarbons, the reaction may be caused or accelerated by the action of light; difficulties have been experienced, however, in that such reactions have proceeded with violence or have been with difficulty controlled so as to result in the formation of non-uniform or undesired products. Ordinarily there are several possible reactions and without a rigid control of conditions these are apt to take place simultaneously. By my improved processes referred to, the amount or effectiveness of the light upon the reagents during the reaction is automatically regulated and progressively increased from the minimum amount, which is such an amount as may safely be applied to the reagents at the beginning of the reaction to the maximum amount, which may be direct and uninterrupted sunlight or other form of light at the end of the reaction. This process generally takes the form of causing the light to shine through an advancing column or body of vapor or gases reaction in which is to be caused to take place. The advancing column or current may flow in a direction directly opposite the path of the light rays or may cross and recross such path. Thus, I may make use of a succession of jackets or conduits of transparent material and introduce the mixture of halogen and hydrocarbon or other reagents which may be treated in the manner described within the jacket farthest removed from the light where it is protected by the action of light by the outer jackets through which the light must pass before it can reach the mixture in the inner jacket. From this point, the mixed substances are caused to traverse each jacket or compartment in turn from the inner, or farthest removed from the light to the outer, that is, the one nearest to the light, the chlorination or other reaction proceeding in increasing degree as the reacting mixture is exposed to increasing amounts of light. Since the penetration of actinic rays through any gaseous mixture is inversely proportional to the concentration in such mixture of any material affected by such rays, it will be obvious that in the method referred to an automatic regulation of the amount of reaction taking place at any given point in the advance of the mixture is made possible. Taking a mixture of chlorin and methane for example, and advancing it against the travel of the light, it will be obvious that at the point where the light first impinges and its actinic power is at a maximum, the concentration of the chlorin and of the methane will be at a minimum, while at the point of maximum concentration of these two gases, the reaction-inducing power of the light will be at a minimum. At any intermediate point, the concentration and intensity will be intermediate. This results in an even distribution of the reaction throughout the reaction chamber without localization of intense reaction and development of heat, and consequently in a smooth and even progress of reaction and smooth and even chlorination with production of definite products. Among the various reactions which may effectively be carried out by the method referred to and in the apparatus to be described, the reaction of halogens with saturated hydrocarbons in the gaseous or vapor state, producing substitutive reactions may be particularly noted. Thus, for example, natural gas, ethane, propane, methane, etc. may be caused readily to combine by substitutive reactions, with halogens, such as chlorin, to form desired products, of which I have prepared a large number, such for example, as carbon-tetra-chlorid, chloroform, etc. with the formation of hydrochloric acid as a by-product. Smooth and regular reactions with the production of undesired products reduced to a minimum, can be readily secured.

For carrying out methods such as I have indicated, various apparatus may be employed, and the object of my present invention is to provide apparatus for carrying out such processes. In carrying out such processes, it is sometimes desirable to regulate or modify the temperature of the reacting substances at different points within the apparatus, thereby giving a positive control of the main locus of reaction, as will subsequently be more fully described.

In order that a clearer understanding of my invention may be had, attention is hereby directed to the accompanying drawings forming part of this specification, and illustrating various forms of apparatus which I have found effective. In the drawings, Figure 1 represents, in vertical section, a simple form of cell in which the process may be carried out, Fig. 2 is a similar view of a pair of units connected together and provided with various means for heating and cooling the reactive gases at different points in the apparatus, and for draining liquid which has condensed in the apparatus from different points thereof, Fig. 3 represents, in vertical section, a cell in which a modified form or forms of the process may be carried out, Fig. 4 is a vertical section of a series of units arranged for air-cooling, Fig. 5 is a vertical section of a cell arranged for cooling or heating by a circulation of water through parts of the apparatus, Fig. 6 and Fig. 7 are diagrammatic plan views of arrangements when grouping a plurality of cells in relation to artificial sources of light, Fig. 8 is a sectional view illustrating the preferred manner of assembling a cell and Fig. 9 is an enlarged detail of the same.

Referring to the drawings, in Fig. 1 is shown a cell in which a series of plates of glass 1, 2, 3, 4, 5, 6, 7, 8, 9 and 10 are set in parallel position, alternate plates 3, 5, 7 and 9 being suitably secured at one end, as the bottom to frame-member 11 of the cell, these plates terminating at their other or top ends some distance from frame-member 12. Alternate plates 2, 4, 6 and 8 are secured at the opposite end to frame-member 12 and do not quite extend to frame-member 11. Plates 1 and 10 constituting the front and back of the cell extend from one frame-member to the other. Reacting gaseous ingredients, such for example, as chlorin and a hydrocarbon, such as propane are admitted into the apparatus to the rear of plate 9 by inlet 13, and the gaseous chlorinated hydrocarbon or other completed product may be removed through outlet 14 immediately to the rear of front plate 1 and led thence, if desired, to a condenser. The particular point, however, at which the condensed chlorinated product is removed will, of course, depend upon its condensability, that is, the temperature at which it becomes liquid and the temperature maintained in the apparatus. The apparatus is, of course, provided with closed sides, not shown in the diagrammatic drawings, to prevent the entrance of light, except through the front plate 1, the path of the reactive ingredients being from the inlet to the outlet 14, around the various plates in order, as is shown by the arrows in the drawings, from the back to the front. I may employ a mirror as the last plate 10 in the apparatus and this seems to produce beneficial results, but is not necessary. In Fig. 1, plate 10 is illustrated as a mirror, having a rear reflecting surface 10$^a$. The source of light in the drawing is represented at 15 in front of the first plate 1. In the drawing, this source of light is a mercury vapor lamp. The source of light may, however, be direct sunlight or an artificial light other than that illustrated.

It is evident that while I prefer to make the transparent elements of my apparatus of glass, my invention is not limited to the use of glass, since I may use other material through which light may be transmitted, such as quartz, celluloid, or mica. In constructing an apparatus in which parallel glass plates are used, as has been described in connection with Fig. 1 of the drawings, the same may be assembled and arranged in a number of manners. I find it of advantage, however, to make complete cells such as that illustrated in Fig. 1 of the drawings, of glass and cement, and to prevent breakage of the glass plates because of difference of expansion between cement and glass, I find it advantageous to interpose lead between the edges of the glass and cement. In Fig. 9, is illustrated the edge of one of the glass plates 1 with a strip of lead 16 bent around one edge of the same. The lead may be, for example, formed in bent strips, such as are used in building up colored glass windows. In forming the cell, a number of the plates, such as 1, 3, 5 and 7 referring to Fig. 8 are placed on edge in a shallow greased box, with strips of lead 16 positioned about the lower edges of the plates, the plates being suitably held in parallel relation with their lower edges a desired distance above the bottom of the box. Cement is then poured into the box and allowed to harden, forming one side of the cell. When this has hardened, the partially completed cell is removed and placed in another position in which another side of the apparatus is cast similarly, this being, for example, the side or top 12 shown in Fig. 8 in which the edges of plates 1, 2, 4, 6 and 7 are secured. The other two sides of the cell at right angles to surfaces 11 and 12 are then similarly cast and also the rear member 17 so that a structure is formed in which light only can enter through the front plate 1. In casting the cell, provision is made for leaving the inlet and outlet openings 13 and 14, various openings 18 for thermometers and other openings, if it is desired to provide drip pipes in the bottom of the cell for draining condensate from the apparatus, and also if it be desired to connect the different compartments of the cell by pipes which may extend outside the apparatus for cooling or heating purposes, as will be described.

As stated, the back plate of the apparatus, such as 10 in Fig. 1 or 7 in Fig. 8 may, if desired, be a mirror. In some cases when very reactive gases are employed in the process, the back plate of the cell may be formed of tinted glass, or a sheet of colored paper may be placed over the glass of the back plate to prevent too great a reaction within the last cell.

In using the apparatus, when artificial light such as that produced by Cooper-Hewitt mercury vapor lamps is employed, I prefer to space different cells around each source of light so as to utilize the light as completely as possible. In Figs. 6 and 7, I have shown preferred arrangements for Cooper-Hewitt lights. In Fig. 6, the various lamps 15 are arranged in parallel relation with multiple cells 19, 19' arranged on one side of the same and multiple cells 20, 20' arranged on the other side of the same. In Fig. 7, I have shown four cells, 21, 22, 23 and 24 disposed on all four sides of a source of light 15.

In Fig. 2, I have illustrated a multiple cell composed of the parallel units 25 and 26, provided with various means for controlling the temperature of the gases passing through the apparatus and also for withdrawing liquid which has condensed in the apparatus during the reaction. In certain cases, I find it useful to modify the temperature between different cells, or different compartments of the cell, for the purpose of more perfectly controlling the operation. For example, when chlorinating a hydrocarbon, such as ethane, propane or methane, considerable heat is evolved, and I find that this leads to the temperatures between different plates being different. I find that, by modifying these temperatures, I can obtain a much more uniform and perfect working of my process. Thus by causing the gas that passes between two adjacent plates of glass in the apparatus to pass through a suitable cooling coil or other device intended to alter its temperature before it passes into the next cell or compartment in order, and by maintaining each coil at a temperature appropriate to its particular position in the series of cells, such a desired regulation of temperature may be effected. In certain operations and particularly in those chlorinations where much heat is evolved, I find it of advantage also to warm the gas entering the first cell and to cool the gas between each of the other cells or compartments, maintaining the cooling coils at a temperature of about thirty to forty degrees C. Further advantages are gained by so arranging each of the cooling coils as to enable any materials which are condensable at such coils to be removed therefrom.

Various devices of this character are illustrated in the apparatus shown in Fig. 2. As illustrated, the reactive gases entering through pipe 13' pass through a coil 27 immersed in a vessel 28 filled with water which may be heated to a desired temperature by a gas burner or other source of heat 29. As the chlorination or other reaction proceeds, different substances may be formed at different portions of the apparatus, and accordingly, I have illustrated in the drawings drain pipes 30, 31, 32 and 32' leading from various points of the apparatus, determined by experience and the temperature of the condensed products which it is desired to obtain. The ends of the drain pipes should be sealed to prevent gas escaping therefrom, and accordingly as a means for achieving this purpose, I have shown the ends of the first three drain pipes referred to immersed in liquid in containing vessels 33, and pipe 32' provided with a bend filled with liquid to provide a seal.

I have illustrated the units 25 and 26 of the multiple cell connected by a pipe 34, provided with a cooling coil 35 immersed in a vessel 36 containing cooling water or other fluid. As illustrated, a drain pipe 37 may lead from the lower bend of coil 35 to lead-off products which are condensable at this point, the drain pipe being sealed to prevent the escape of gas therefrom by providing it with a bend 38 filled with fluid. Other means for cooling the gases passing through the apparatus are illustrated in Fig. 2 at 39 which represents an air-cooled coil and 40 which represents a vessel through which the pipe 41 passes in connecting adjacent compartments of the cell, cooling water being kept in circulation through vessel 40 around pipe 41. In this illustration, the products of the reaction which have not previously been condensed and withdrawn may pass out through the outlet 14 which may lead, for example, to a suitable condenser. It should be understood that the different means for cooling the reacting gases illustrated need not all be used in one apparatus, but are illustrated merely for the purpose of showing different modes of cooling gases which may be employed. In practice the U-tube 35 passing through a water jacket 36 and provided with a drain pipe 37, as stated, is found to be an excellent arrangement for both cooling the gas mixture which passes therethrough and for separating out the liquid which condenses, and this arrangement may be used at each point in the apparatus in which it is desirable to both cool the gases and to withdraw condensate.

Another manner in which the cells may be cooled is illustrated in Fig. 4, in which the apparatus consists of a series of cells 42, 43, 44 and 45 composed of parallel glass plates with a desired number of compartments in each unit, the different units being spaced apart so as to permit the cooling of the same by the air. In this case all of the parallel plates are transparent with the exception of the rear plate of the last unit 45 and the gases are led from the front compartment of one unit to the rear compartment of the unit immediately in front of the same by pipes 46. Another method of cooling or heating a cell is illustrated in Fig. 5. As there illustrated, the cell 47 may be provided near the rear end thereof with transparent plates 48 and 49 extending all the way from the top to the bottom of the apparatus, hot water being circulated through the hot water jacket thus made by means of pipes 50 and 51. Similarly, pairs of glass plates 52, 53 and 54 may be provided in the forward part of the apparatus to form jackets for the passage of cold water therethrough, the water jackets thus formed being connected by pipes 55, 56, water for cooling purposes being let into and through these jackets by pipes 57 and 58. The gases passing through the apparatus are led around the heating and cooling jackets by pipe connections 59, 60, 61 and 62, the gases entering the apparatus by inlet 13 and the products of reaction escaping through outlet 14. In connection with this means of heating or cooling or both, it is, of course, obvious that light for effecting the reaction will pass through a number of transparent jackets containing heating or cooling water. Other means of heating the gases in the compartments in which reaction has just started or of otherwise modifying the temperatures produced by the reaction may, of course, be used. For example, the temperature may be raised where desired by passing an electric current through a heated coil or wire extended through one or more of the cells. In treating hydrocarbon vapors or gases with chlorin or other reagent, I may use a neutral or inactive gas as a diluent of the reactive mixture, such for example, as steam, carbon dioxid and nitrogen. The use of such neutral gases is not necessary, but under certain conditions may be used to advantage. I find that in starting up a cell, it is sometimes of advantage to introduce steam and when a cell operates at too high a temperature, or whenever temperature within the cell is to be controlled, steam or neutral gases may be admitted.

In Fig. 3, I have illustrated a modified form of apparatus for carrying out my broad process invention, this form of apparatus being of value because of the very small amount of glass or other transparent medium which is necessary in its construction, and because of the ease with which large amounts of reacting gases may be operated on therein. In the illustration, the cell 63 is illustrated in the horizontal section, all of the sides of the box construction shown, such as 64, 65 and 66 being formed of opaque material, except the side 67 which is of glass or other transparent or translucent material. Within the box thus formed, there are a number of partitions 68, 69, 70, 71, etc. arranged at right angles to the side 67 and extending partly across the cell, alternate partitions 68, 70, etc. extending from side 65 only part of the way to side 67, and the intermediate partitions 69, 71, etc. extending from side 67 not quite all the way to side 65, so that a continuous passage is provided for gases around the partitions from inlet 13 to outlet 14. In this construction, the partitions 68, 69, etc., need not be formed of glass or transparent material. In one form of this apparatus the plate glass 67 is left perfectly transparent at the edge in contact with side 66 at the outlet end of the apparatus, the transparency of plate 67 being progressively diminished from its right hand edge referring to Fig. 3 to its left hand edge where it is quite opaque. The plate 67 may be varnished or screened or clouded in any suitable manner to produce this effect, the variation in transparency from one end of the plate to the other being either uniform or else the variation being in steps, the glass opposite each of the compartments being given a different light transmitting value. With this apparatus light from a source 72, for example, falls at right angles upon the glass plate 67, the plate 67 permitting a maximum amount of light to enter the apparatus at the outlet side thereof, and the light entering the apparatus being progressively diminished from this side toward the inlet side of the apparatus. With this form of apparatus, large amounts of gas are exposed to increasing amounts of light as the gases pass from the inlet to the outlet of the cell.

The same form of apparatus may be used in a different manner, the glass plate 67 being left plain and transparent. In this method an artificial source of illumination shown in dotted lines at 73 is so positioned with relation to the plate 67 that the direct rays of the light illuminate the last compartment of the cell near the outlet, while only indirect and oblique rays can affect the gases at the inlet side of the device. It is evident that the source of light 73 being placed directly above the rear compartment of the apparatus, the gases within the same compartment will be affected by large amounts of light passing directly through the glass plate at this end of the apparatus, while progressively less amounts of light will affect the compartments between the outlet end and the inlet end of the cell because of the increasing obliquity of the rays impinging against the glass plate opposite the compartments further away from the outlet because of which a progressively decreasing amount of light enters the chambers in the direction of the inlet.

Other forms of apparatus may be used to attain the same results as those achieved in the apparatus described, which other forms I have not deemed it necessary to illustrate. For example, I may utilize mirrors or reflecting screens to produce a greater or less intensity of light in the different parts of the reaction chamber. Two or more mirrors so inclined to each other as to produce varying light effects within the chamber may be used within the scope of my invention. It is not essential that plane plates of glass or other transparent material be used to form the different compartments of the apparatus shown in Fig. 1 for example, since the transparent conduit for the gases may be formed of a continuous glass tube, which may, for example, be so bent as to cross the path of the light a number of times in the progress of the gases toward the light. Since chlorin gas, for example, is relatively opaque to light, a mixture of the reactive gases comprising chlorin forms an effective filter or screen for reducing the amount of light which will pass through a body of the same to affect reacting gases in the rear thereof. Therefore, it is within the scope of my invention to simply provide a compartment having a transparent wall in which materials in which reaction is to be caused may be introduced and to provide a vessel having transparent walls between such compartment and a source of actinic light, a gas comprising chlorin being introduced into said transparent walled vessel to reduce the amount of light reaching said reaction compartment.

Reactions of the character described may be carried out not only when the reacting materials are gaseous, but also when the same are liquid. Even if both the reacting materials are liquid, the general method of procedure is the same, the underlying principle being in general the bringing of the reacting materials in mixed condition past a number of semi-transparent partitions, each of which cuts off a part of the light so that the reacting mixtures are gradually brought under the influence of greater and greater amounts of light, or the actinic effectiveness of the light utilized becoming greater and greater as the reacting mixture proceeds nearer and nearer the source of light.

Having now particularly described my invention, what I claim and desire to protect by Letters Patent is as follows:—

1. Photochemical apparatus consisting of a series of parallel plates pervious to light arranged in a box-like chamber, impervious to light except through said plates, said plates being so arranged as to afford a continuous passageway for gases around the same in order, said chamber having an inlet at one end and an outlet at the other end.

2. Photochemical apparatus consisting of a series of transparent conduits arranged to afford a continuous passageway, one in front of the other, and means for preventing light from entering said conduits except by passing through the front one and thence through the others in order.

3. Photochemical apparatus consisting of a series of transparent conduits arranged to afford a continuous passageway, one in front of the other, a light-tight box in which said conduits are arranged in such manner that light can only enter the box by passing through said conduits in order, and a reflector at the back of the box.

4. In photochemical apparatus, a chamber having a gas inlet and outlet, a series of compartments arranged therein in such manner as to cause gases to pass through the same in order in traveling from the inlet to the outlet, and means for directing light into said chamber in such manner that light of the greatest actinic effectiveness enters the compartment nearest said outlet, and that light of the least actinic effectiveness enters the compartment most distant from the outlet, and that light enters the compartments between said first two mentioned compartments in amounts of progressively decreasing actinic effectiveness.

5. In photochemical apparatus, a chamber having a gas inlet and outlet, and so arranged that gases pass through a restricted path from said inlet to said outlet, a source of actinic light, and means for directing light from said source into said chamber in such manner that light of the greatest actinic effectiveness enters the chamber at a point near the outlet, and that light acts on said path, when reactive gases are passing therethrough, with progressively decreasing actinic effectiveness from said point to the said inlet.

6. In photochemical apparatus, a compartment having a transparent wall, means for introducing chlorin and materials to be chlorinated thereto, a source of actinic light, a transparent walled vessel between said source and said compartment, and means for introducing gas comprising chlorin into said vessel.

7. In photochemical apparatus, the combination of means affording a passageway for gases from an inlet to an outlet, so arranged that light directed thereon will act with greatest actinic effect on the gases near the outlet and with less actinic effect on the gases nearer the inlet, and means for regulating the temperature of gases passing through said passageway.

8. Photochemical apparatus comprising a series of transparent conduits arranged to afford a continuous passageway from rear to front, one in front of the other, means for causing light to enter said conduits only by passing through the same in order from the front, and means for regulating the temperature of the reactive substances in some of said conduits.

9. Photochemical apparatus comprising in combination, a source of light, a plurality of cells, and means for directing gases through said cells in order, toward said source, said cells being constructed to permit the passage of light from said source only through the same in order, and arranged to permit the cooling of the forward cells in operation.

10. Photochemical apparatus, comprising a series of transparent conduits arranged to afford a continuous passageway for gases toward a light, means for preventing light from entering said conduits except by passing through the same in order, means for removing liquids from said conduits, and means for cooling gases passing from one conduit to the next.

11. In photochemical apparatus, a reaction chamber having opaque walls and a transparent wall, and a source of actinic light arranged outside said chamber so that rays therefrom enter said chamber through said transparent wall, said chamber having an inlet and an outlet, and being so arranged that a current of reactive gases passing through the same moves in a general direction opposed to that of rays of light entering such chamber from said source, progressively from said inlet to said outlet.

12. In photochemical apparatus, a reaction chamber having opaque walls and a transparent wall, said chamber having an inlet and an outlet, and being so arranged as to cause a current of gases passed through the same to progress from the end opposite said transparent wall toward said wall, in a path crossing and recrossing a line normal to said transparent wall.

13. In photochemical apparatus, a reaction chamber having opaque walls and a transparent wall, said chamber having an inlet and an outlet, and being so arranged as to cause a current of gases passed through the same to progress from said inlet to said outlet in a path crossing and recrossing a line normal to said transparent wall.

This specification signed and witnessed this 29th day of June, 1914.

WALTER O. SNELLING.

Witnesses:
· D. I. BROWN,
A. J. PHILLIPS.